United States Patent
Tamaru

(10) Patent No.: US 7,835,550 B2
(45) Date of Patent: Nov. 16, 2010

(54) FACE IMAGE RECORDING APPARATUS, IMAGE SENSING APPARATUS AND METHODS OF CONTROLLING SAME

(75) Inventor: Masaya Tamaru, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1168 days.

(21) Appl. No.: 11/480,468

(22) Filed: Jul. 5, 2006

(65) Prior Publication Data

US 2006/0274960 A1    Dec. 7, 2006

(30) Foreign Application Priority Data

Jul. 6, 2005    (JP)    .............................. 2005-196979

(51) Int. Cl.
G06K 9/46    (2006.01)
G06K 9/20    (2006.01)
G06K 9/36    (2006.01)
G06F 3/048   (2006.01)

(52) U.S. Cl. ........................ 382/118; 382/190; 382/232; 382/282; 715/838

(58) Field of Classification Search ................. 382/181, 382/239, 305, 232, 299, 240, 244, 286, 172, 382/284, 302, 311, 190, 282, 118; 715/838, 715/781, 769, 209, 764, 800; 84/609, 645; 358/1.2, 1.9, 1.16, 1.15, 1.8, 1.18; 348/231.99, 348/333.11; 345/619, 634, 600, 629, 698
See application file for complete search history.

(56) References Cited

U.S. PATENT DOCUMENTS

| | | | |
|---|---|---|---|
| 5,229,589 A * | 7/1993 | Schneider | .................... 235/456 |
| 5,724,579 A | 3/1998 | Suzuki | |
| 6,813,395 B1 * | 11/2004 | Kinjo | .......................... 382/305 |
| 6,917,441 B2 * | 7/2005 | Suzuki et al. | ................ 358/1.2 |
| 2002/0181784 A1 | 12/2002 | Shiratani | |
| 2008/0317354 A1 | 12/2008 | Shiratani | |

FOREIGN PATENT DOCUMENTS

| | | |
|---|---|---|
| JP | 7-245723 | 9/1995 |
| JP | 10-334213 | 12/1998 |
| JP | 2001-45257 | 2/2001 |
| JP | 2002-358522 A | 12/2002 |
| JP | 2003-92726 | 3/2003 |
| JP | 2004-214795 | 7/2004 |
| JP | 2005-63087 | 3/2005 |
| JP | 2007-305139 A | 11/2007 |
| JP | 2002-358522 A5 | 5/2008 |
| JP | 2007-305139 A5 | 7/2008 |

* cited by examiner

*Primary Examiner*—Sheela C Chawan
(74) *Attorney, Agent, or Firm*—McGinn IP Law Group, PLLC

(57) ABSTRACT

The image of a face is cut from an image obtained by image sensing. Original image data is read from a memory card and the portion of the original image that is the image of the face is extracted by trimming. The image of the face is subjected to correction and other processing. Data representing the image of the face thus processed is recorded on the memory card. Thus, the original image and the image of the face are recorded on the memory card. The original image and the image of the face can be displayed by reproducing the data recorded on the memory card.

20 Claims, 14 Drawing Sheets

ORIGINAL IMAGE FILE

FACE IMAGE FILE

ORIGINAL IMAGE FILE

FACE IMAGE RECORDING APPARATUS, IMAGE SENSING APPARATUS AND METHODS OF CONTROLLING SAME

BACKGROUND OF THE INVENTION

1. Field of the Invention

This invention relates to a face image recording apparatus, image sensing apparatus and methods of the same.

2. Description of the Related Art

By sensing the image of a subject using a digital still camera, image data representing the image of the subject is stored in an image file and recorded on a recording medium such as a memory card. In addition to the image data representing the image of the subject obtained by image sensing, thumbnail image data is stored in the image file. However, a thumbnail image represented by thumbnail image data is small in size and this makes it difficult to ascertain the content thereof.

Meanwhile, cutting the image of a face from an image has been proposed (see the specifications of Japanese Patent Application Laid-Open Nos. 10-334213 and 2003-92726), and it has also been proposed to extract, as a subordinate image, a region of interest such as a ruler from within an image. In addition, see also the specification of Japanese Patent Application Laid-Open No. 2001-45257.

However, no consideration has been given to recording the image of a face, which has been cut from the original image of a subject, in association with the original image.

SUMMARY OF THE INVENTION

Accordingly, an object of the present invention is to so arrange it that the image of a face can be recorded in association with the original image.

According to a first aspect of the present invention, the foregoing object is attained by providing a face image recording apparatus comprising: a first reading device (means) for reading original image data that has been recorded on a first recording medium; a face image detecting device (means) for detecting the image of a face contained in an original image represented by the original image data read by the first reading device (means); a face image extracting device (means) for extracting the image of the face detected by the face image detecting device (means); and a recording control device (means) for recording face image data, which represents the image of the face extracted by the face image extracting device (means), on a second recording medium in association with the original image data.

The first aspect of the present invention also provides a control method suited to the above-described face image recording apparatus. Specifically, the first aspect of the present invention provides a method of controlling a face image recording apparatus, comprising the steps of: reading original image data that has been recorded on a first recording medium; detecting the image of a face contained in an original image represented by the original image data that has been read; extracting the image of the face detected; and recording face image data, which represents the extracted image of the face, on a second recording medium in association with the original image data.

The first aspect of the present invention also provides a program for implementing the method described above.

In accordance with the first aspect of the present invention, original image data that has been recorded on a first recording medium is read. The image of a face is detected from the original image represented by the read original image data, and the detected image of the face is extracted. Image data representing the extracted image of the face is recorded on a second recording medium in association with the original image data.

In accordance with the first aspect of the present invention, face image data representing a face image contained in an original image can be recorded on a recording medium in association with the original image data. By observing the face image, one can ascertain whose face appears in the original image.

The first recording medium on which the original data has been recorded and the second recording medium on which the face image data has been recorded may be the same recording medium.

The apparatus may further comprise a determination device (means) for determining whether a plurality of images of faces have been extracted by the face image extracting device (means). In this case, the recording control device (means) would record face image data representing the plurality of face images on the second recording medium as individual frames in accordance with extraction of the plurality of face images by the determination device (means). Even if the original image contains a plurality of face images, these face images can be recorded on the second recording medium as individual frames.

The apparatus preferably further comprises a face image processing device (means) for subjecting the image of the face extracted by the face image extracting device (means) to at least one type of image processing from among resizing, brightness correction, color correction, sharpness correction and noise reduction. In this case, the recording control device (means) would record face image data, which represents the image of the face that has been subjected to the processing by the face image processing device (means), on the second recording medium.

The original image data may be stored in an original image file and recorded on the first recording medium, and the face image data may be stored in a face image file different from the original image file and recorded on the second recording medium.

In a case where the first recording medium and second recording medium are the same recording medium, the original image data may be recorded in an original image recording area of an original image file in which a thumbnail image data recording area and this original image data recording area have been defined. In this case, the apparatus would further comprise a thumbnail face image data generating device (means) for generating thumbnail face image data representing a thumbnail image of the image of the face extracted by the face image extracting device (means), and the recording control device (means) would record the thumbnail face image data, which has been generated by the thumbnail face image data generating device (means), in the thumbnail image data recording area.

In a case where the thumbnail image data recording area has been divided into a thumbnail original image data recording area and a thumbnail face image data recording area, the thumbnail original image data may be recorded in the thumbnail original image data recording area, and the thumbnail face image data may be recorded in the thumbnail face image data recording area.

The apparatus may further comprise a second reading device (means) for reading the thumbnail original image data that has been recorded in the thumbnail original image data recording area and the thumbnail face image data that has been recorded in the thumbnail face image data recording area, and a first display control device (means) for controlling a display unit in such a manner that the thumbnail original image represented by the thumbnail original image data and thumbnail face image represented by the thumbnail face image data read by the second reading device (means) are displayed on the same display screen. A thumbnail image of the image of a face and a thumbnail image of the entire image of the subject can be displayed.

The apparatus may further comprise a third reading device (means) for reading the face image data that has been recorded on the second recording medium, and a second display control device (means) for controlling a display unit in such a manner that the original image represented by the original image data read by the first reading device (means) and the face image represented by the face image data read by the third reading device (means) are displayed on the same display screen.

The apparatus may further comprise a face image designating device (means) for designating the face image displayed on the display unit, and a third display control device (means) for controlling the display unit in such a manner that a part of the original image, which is displayed on the display unit, designated by the face image designated device (means) will be clearly indicated.

The second display control device (means) may control the display unit so as to display the original image and the face image on the same display screen in such a manner that the size of the original image represented by the original image data read by the first reading device (means) and the size of the face image represented by the face image data read by the third reading device (means) will take on the same size.

Further, the second display control device (means) may control the display unit in such a manner that the original image represented by the original image data read by the first reading device (means) and the face image represented by the face image data read by the third reading device (means) will be displayed in correspondence on the same display screen. In this case, the apparatus would further comprise an output unit (a printer) for outputting (printing) the original image and face image, which are displayed on the same display screen, under the control of the second display control device (means).

According to a second aspect of the present invention, the foregoing object is attained by providing an image sensing apparatus comprising: an image sensing device (means) for sensing the image of a subject and outputting original image data representing the image of the subject; a face image detecting device (means) for detecting the image of a face contained in an original image represented by the original image data that has been output from the image sensing device (means); a face image extracting device (means) for extracting the image of the face detected by the face image detecting device (means); a thumbnail original image data generating device (means) for generating thumbnail image data of the original image represented by the original image data that has been output from the image sensing device (means); a thumbnail face image data generating device (means) for generating thumbnail face image data representing a thumbnail image of the face image extracted by the face image extracting device (means); and a recording control device (means) for storing the thumbnail original image data generated by the thumbnail original image data generating device (means), the thumbnail face image data generated by the thumbnail face image data generating device (means) and the original image data that has been output from the image sensing device (means) in a single original image file and recording the file on a recording medium.

The second aspect of the present invention also provides a control method suited to the above-described image sensing apparatus. Specifically, the second aspect of the present invention provides a method of controlling an image sensing apparatus, comprising the steps of: sensing the image of a subject and obtaining original image data representing the image of the subject; detecting the image of a face contained in an original image represented by the original image data obtained; extracting the image of the face detected; generating thumbnail image data of the original image represented by the original image data obtained by image sensing; generating thumbnail face image data representing a thumbnail image of the face image extracted; and storing the thumbnail original image data generated, the thumbnail face image data generated and the original image data obtained by image sensing in a single original image file and recording the file on a recording medium.

The second aspect of the present invention also provides a program for implementing the method described above.

In accordance with the second aspect of the present invention, the image of a subject is sensed and original image data representing the image of the subject is obtained. The image of a face is detected from the original image represented by the obtained original image data, and the detected image of the face is extracted from the original image. Thumbnail image data of the original image and thumbnail image data of the face image is generated respectively. The thumbnail original image data generated, the thumbnail face image data generated and the original image data obtained by image sensing is stored in a single original image file and the file is recorded on a recording medium.

In accordance with the second aspect of the present invention, original image data, thumbnail original image data and thumbnail face image data can be stored in a single original image file. As a result, the original image, thumbnail original image and thumbnail face image can all be displayed. In a case where the image of a face is difficult to discern from a thumbnail original image, the image of the face that is contained in the original image can be checked comparatively simply by observing the thumbnail face image.

According to a third aspect of the present invention, the foregoing object is attained by providing an apparatus for recording an image of interest, comprising: a reading device (means) for reading original image data that has been recorded on a first recording medium; an image-of-interest detecting device (means) for detecting a prescribed image of interest from an original image represented by the original image data read by the reading device (means); an image-of-interest extracting device (means) for extracting the image of interest detected by the image-of-interest detecting device (means); and a recording control device (means) for recording image-of-interest data, which represents the image of interest extracted by the image-of-interest extracting device (means), on a second recording medium in association with the original image data.

The third aspect of the present invention also provides a control method suited to the above-described apparatus. Specifically, the third aspect of the present invention provides a method of controlling an apparatus for recording an image of interest, comprising the steps of: reading original image data that has been recorded on a first recording medium; detecting a prescribed image of interest from an original image represented by the original image data read; extracting the image of interest detected; and recording image-of-interest data, which represents the image of interest extracted, on a second recording medium in association with the original image data.

The third aspect of the present invention also provides a program for implementing the method described above.

In accordance with the third aspect of the present invention, original image data that has been recorded on a first recording medium is read. A prescribed image of interest is detected from the original image represented by the original image data read, and the image of interest detected is extracted. Image data representing the extracted image of interest is recorded on a second recording medium (which may be the same as the first recording medium) in association with the original image data.

In accordance with the third aspect of the present invention, image-of-interest data representing an image of interest contained in an original image can be recorded on a recording medium in association with the original image data.

According to a fourth aspect of the present invention, the foregoing object is attained by providing an image sensing apparatus comprising: an image sensing device (means) for sensing the image of a subject and outputting original image data representing the image of the subject; an image-of-interest detecting device (means) for detecting a prescribed image of interest from an original image represented by the original image data that has been output from the image sensing device (means); an image-of-interest extracting device (means) for extracting the image of interest detected by the image-of-interest detecting device (means); a thumbnail original image data generating device (means) for generating thumbnail image data of the original image represented by the original image data that has been output from the image sensing device (means); a thumbnail image-of-interest data generating device (means) for generating thumbnail image-of-interest data representing a thumbnail image of the image of interest extracted by the image-of-interest extracting device (means); and a recording control device (means) for storing the thumbnail original image data generated by the thumbnail original image data generating device (means), the thumbnail image-of-interest data generated by the thumbnail image-of-interest image data generating device (means) and the original image data that has been output from the image sensing device (means) in a single original image file and recording the file on a recording medium.

The fourth aspect of the present invention also provides a control method suited to the above-described image sensing apparatus. Specifically, the fourth aspect of the present invention provides a method of controlling an image sensing apparatus, comprising the steps of: sensing the image of a subject and obtaining original image data representing the image of the subject; detecting an image of interest from an original image represented by the original image data obtained; extracting the image of interest detected; generating thumbnail image data of the original image represented by the original image data that has been obtained by image sensing; generating thumbnail image-of-interest data representing a thumbnail image of the image of interest extracted; and storing the thumbnail original image data generated, the thumbnail image-of-interest data generated and the original image data obtained by image sensing in a single original image file and recording the file on a recording medium.

The fourth aspect of the present invention also provides a program for implementing the method described above.

In accordance with the fourth aspect of the present invention, the image of a subject is sensed and original image data representing the image of the subject is obtained. The prescribed image of interest is detected from the original image represented by the obtained original image data, and the detected image of interest is extracted from the original image. Thumbnail image data of the original image and thumbnail image data of the image of interest is generated respectively. The thumbnail original image data generated, the thumbnail image-of-interest data generated and the original image data obtained by image sensing is stored in a single original image file and the file is recorded on a recording medium.

In accordance with the fourth aspect of the present invention, original image data, thumbnail original image data and thumbnail image-of-interest data can be stored in a single original image file. As a result, the original image, the thumbnail original image and the thumbnail image-of-interest can all be displayed. In a case where the image of interest is difficult to ascertain from the thumbnail original image, the image of interest that is contained in the original image can be checked comparatively simply by observing the thumbnail image of interest.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
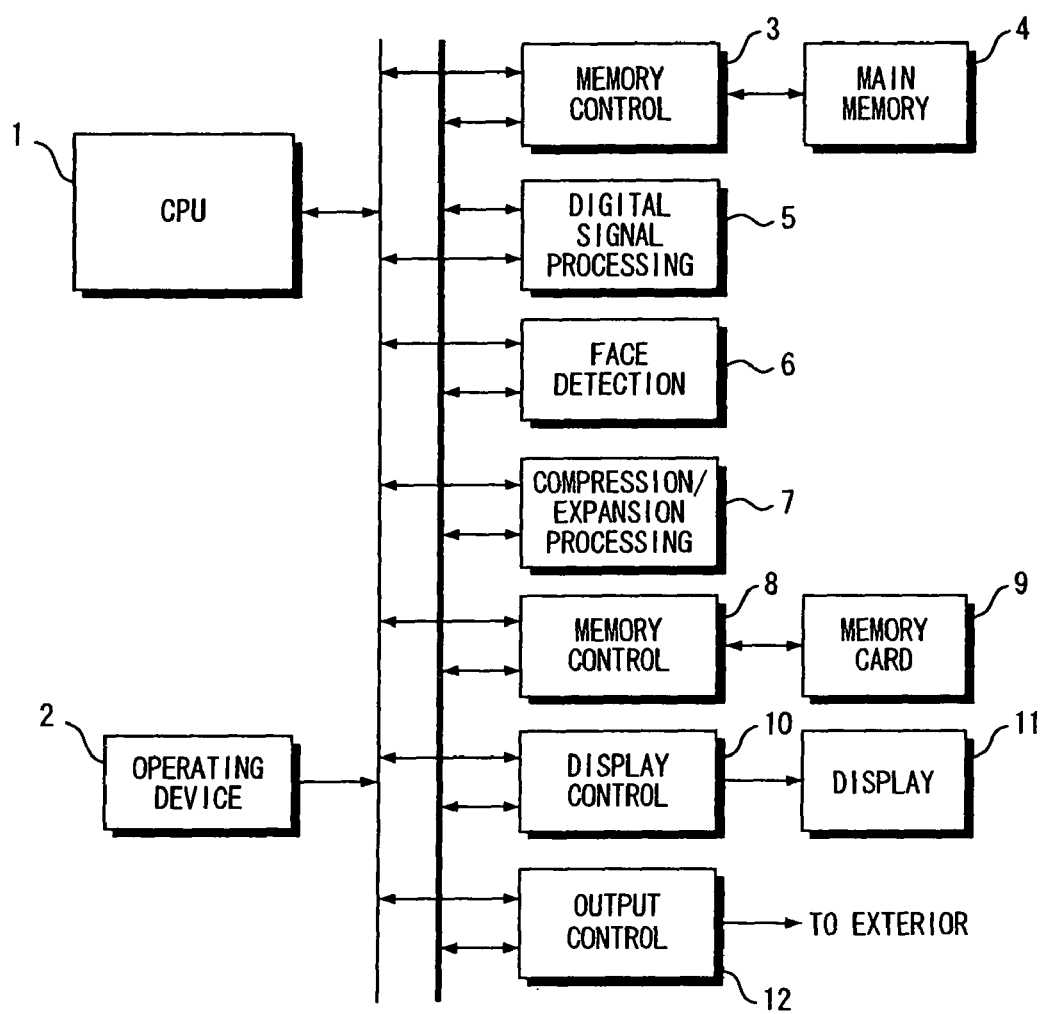
FIG. 1 is a block diagram illustrating the electrical structure of a face image recording apparatus.

FIG. 1 is a block diagram illustrating the electrical structure of a face image recording apparatus according to the present invention.

The operation of the overall face image recording apparatus is controlled by a CPU 1.

The face image recording apparatus is provided with an operating device 2 from which operating signals are output and applied to the face image recording apparatus.

Original image data representing the image (original image) of a subject has been stored on a memory card 9. The original image data is read from the memory card 9 under the control of one memory control circuit 8, applied to a main memory 4 via another memory control circuit 3 and stored in the main memory 4 temporarily. (Also stored in the main memory 4 is a program for performing an operation described later.)

The original image data is read out of the main memory 4 and input to a face detecting circuit 6. As a result, if the original image contains the image of a face, then face image data is obtained by detecting and extracting the face image. The face image data is applied to a digital signal processing circuit 5, which subjects the face image data to prescribed digital signal processing. The details of signal processing executed in the digital signal processing circuit 5 will be described later. The face image data that has been output from the digital signal processing circuit 5 is recorded on the memory card 9 by the memory control circuit 8. The memory card 9 on which the original image data has been recorded and the memory card 9 on which the face image data is recorded may be different cards.

The face image recording apparatus is further provided with a compression/expansion processing circuit 7. This makes it possible to compress image data and to expand image data that has been compressed. The face image recording apparatus is further provided with a display unit 11. By applying the original image data or face image data to a display control circuit 10, the original image or face image is displayed on the display screen of the display unit 11 (it goes without saying that both images may be displayed) by the display control circuit 10.

The face image recording apparatus is further provided with an output control circuit 12. Original image data, face image data and the like can be output to the exterior of the face image recording apparatus by the output control circuit 12. The original image and face image, etc., can be printed by connecting the output control circuit 12 and a printer.

Figure 2:
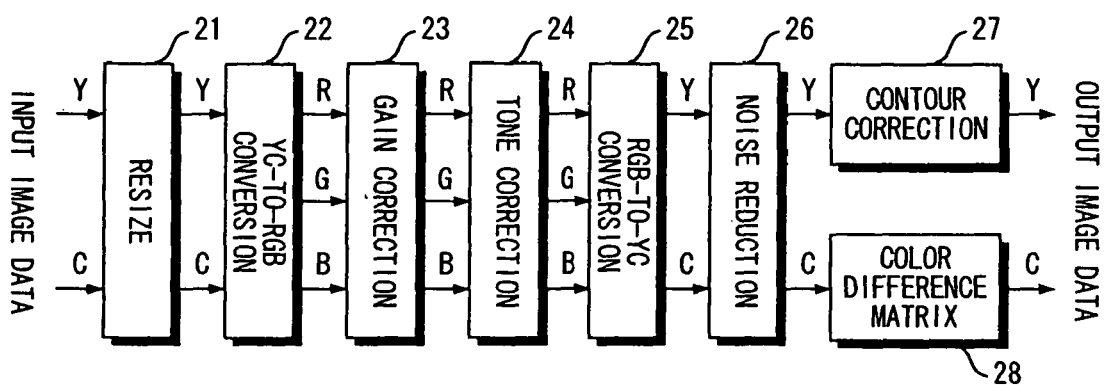
FIG. 2 is a block diagram illustrating the electrical structure of a digital signal processing circuit.

FIG. 2 is a block diagram illustrating the electrical structure of the digital signal processing circuit 5. The latter subjects a face image to appropriate correction processing.

Face image data that is input to the digital signal processing circuit 5 is composed of luminance data Y and color difference data C. The luminance data Y and color difference data C is applied to a resizing circuit 21, which executes resizing processing in such a manner that the extracted face image will take on a prescribed size. The luminance data Y and color difference data C that has been resized is converted to R data, G data and B data in a YC-to-RGB converting circuit 22. The R data, G data and B data obtained by the conversion is subjected to a gain correction in a gain correcting circuit 23 and is then input to a tone correcting circuit 24. Here the R data, G data and B data representing the image of a face is subjected to a tone correction in such a manner that the color of the face will appear in a comparatively attractive face.

The R data, G data and B data that has undergone the tone correction is returned to luminance data Y and color difference data C in an RGB-to-YC converting circuit 25. The luminance data Y and color difference data C is subjected to noise reduction processing in a noise reducing circuit 26. The luminance data Y that is output from the noise reducing circuit 26 is subjected to contour correction processing in a contour correcting circuit 27, and the corrected data Y is output from the digital signal processing circuit 5. Color difference data C that is from the noise reducing circuit 26 is subjected to a color correction in a color difference matrix 28, and the corrected data C is output from the digital signal processing circuit 5.

Figure 3:
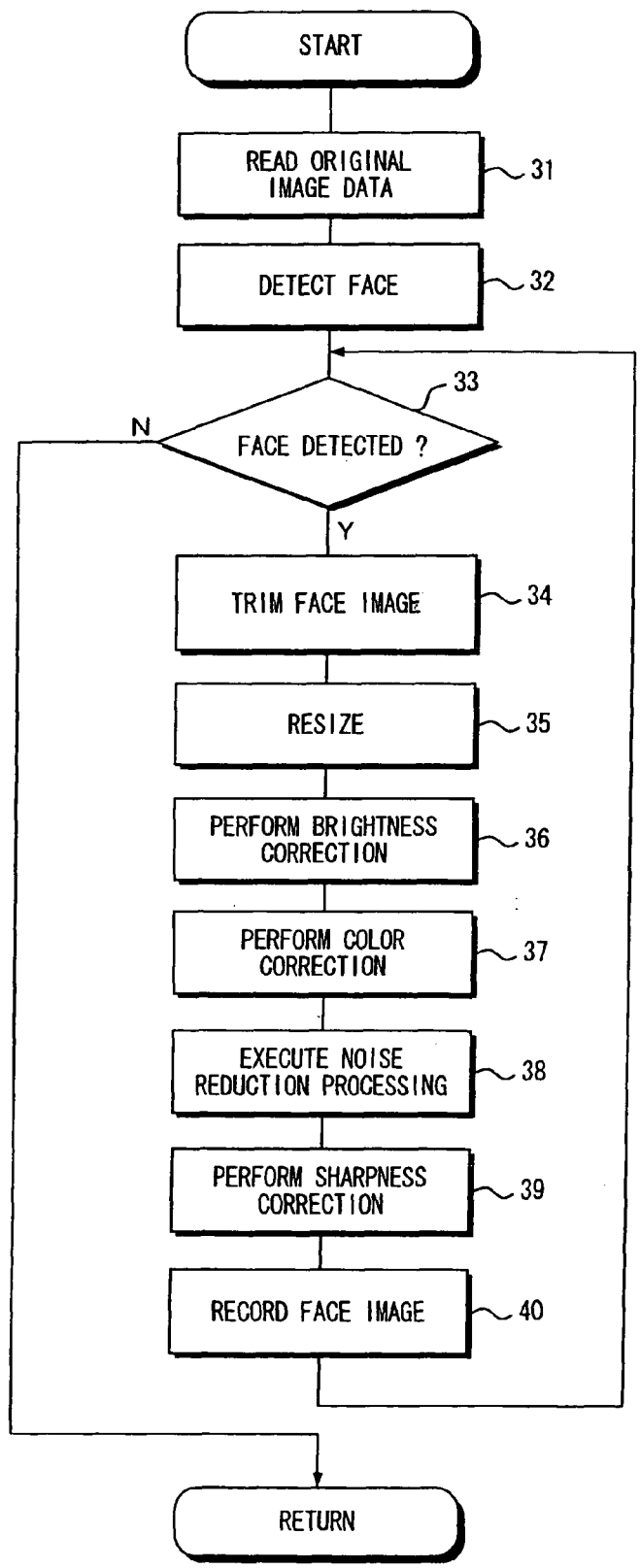
FIG. 3 is a flowchart illustrating processing executed by the face image recording apparatus.

FIG. 3 is a flowchart illustrating processing executed by the face image recording apparatus.

This processing extracts the image of a face from an original image represented by original image data that has been recorded on the memory card 9 and records the face image data representing the image of the face on the memory card 9.

The original image data that has been recorded on the memory card 9 is read by the memory control circuit 8 (step 31) and the read original image data is applied to the face detecting circuit 6, whereby processing for detecting the image of a face contained in the original image is executed (step 32).

If the image of a face is detected ("YES" at step 33), then trimming to a prescribed size is applied so as to extract the detected image of the face (step 34). The extraction processing can be implemented by storing the original image data in the main memory 4 and then reading from the main memory 4 an image in a prescribed area that includes the detected face image.

The face image data representing the image of the face obtained by trimming is subjected to resizing (step 35), brightness correction (gain correction) (step 36), color correction (step 37), noise reduction processing (step 38) and sharpness correction (contour correction) (step 39), as mentioned above. The face image data thus corrected is recorded on the memory card 9 (step 40).

The processing for the above-described corrections (steps 34 to 40) is repeated until face images can no longer be detected from the original image ("NO" at step 33). Accordingly, in a case where the original image contains a plurality of face images, image data representing each of the faces is recorded on the memory card 9.

Figure 4:
FIG. 4 illustrates an example of an original image.
Figure 5:
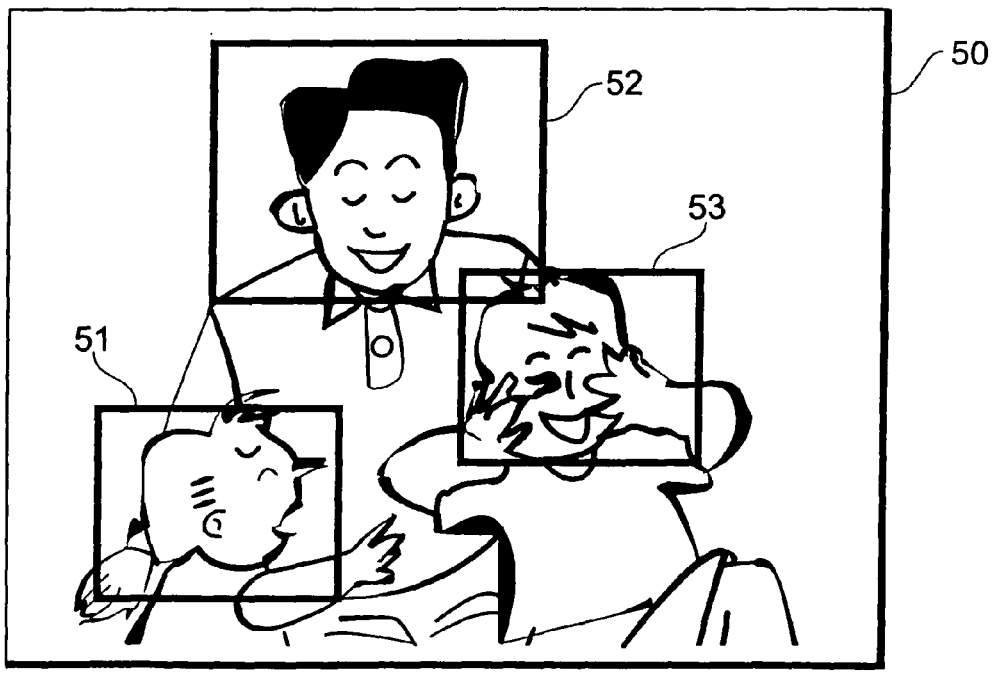
FIG. 5 illustrates an example of an original image.
Figure 6A:
FIGS. 6A to 6C illustrate examples of face images.
Figure 6B:
Figure 6C:

FIGS. 4 and 5 illustrate an example of an original image, and FIGS. 6A, 6B and 6C illustrate face images that have been extracted.

The original image data is read from the memory card 9 and an original image 50 represented by the original image data is obtained (see FIG. 4). The images of faces are detected from the original image 50. As shown in FIG. 5, the original image contains images 51, 52 and 53 of faces. These face images 51, 52 and 53 are detected. The detected face images 51, 52 and 53 are extracted as single frames 55, 56 and 57, respectively, as illustrated in FIGS. 6A, 6B and 6C, respectively.

Figure 7:
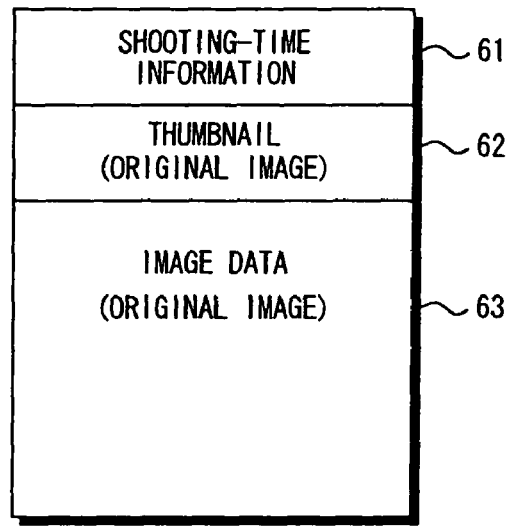
FIG. 7 illustrates an example of an original image file.

FIG. 7 illustrates an example of the file structure (data structure) of an original image file containing original image data.

The original image file contains a shooting-time information recording area 61, a thumbnail recording area 62 and an image data recording area 63.

Original image data has been recorded in the image data recording area 63. Information (shooting date, shutter speed, f-stop, etc.) that prevailed at shooting time when the original image data was obtained has been recorded in the shooting-time information recording area 61. Thumbnail original image data representing a thumbnail image of the original image has been recorded in the thumbnail recording area 62. This thumbnail original image data is generated by the CPU 1.

By reading the original image data that has been recorded in the image data recording area 63 of the original image file, a face image can be extracted from the original image data represented by the original image data in the manner described above.

Figure 8:
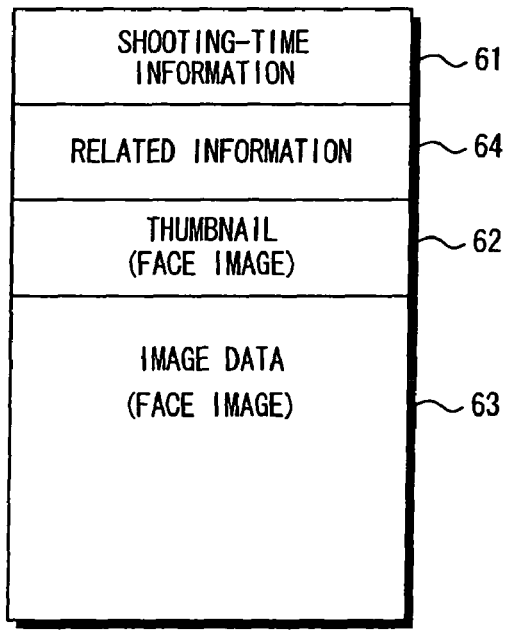
FIG. 8 illustrates an example of a face image file.

FIG. 8 illustrates an example of the file structure of a face image file containing face image data.

In addition to the shooting-time information recording area 61, thumbnail recording area 62 and image data recording area 63, a related-information recording area 64 has been defined in the face image file in a manner similar to that of the original image file.

Image data representing the face image extracted as set forth above is recorded in the image data recording area 63. Thumbnail face image data representing a thumbnail image of the face image is recorded in the thumbnail recording area 62. The thumbnail face image data is generated by the CPU 1. Shooting-time information that has been recorded in the original image file is recorded in the shooting-time information recording area 61. The file name of the original image file for establishing linkage to the original image file and prescribed information regarding the face image, etc., are recorded in the related-information recording area 64.

Such face image files are generated in conformity with the number of face images detected and these are recorded on the memory card 9 in the manner set forth above.

In the embodiment described above, the original image file and the face image file are separate files and both the original image and face image files are recorded on the memory card 9. However, it may be so arranged that the original image file is erased and only the face image file is recorded on the memory card 9.

Figure 9:
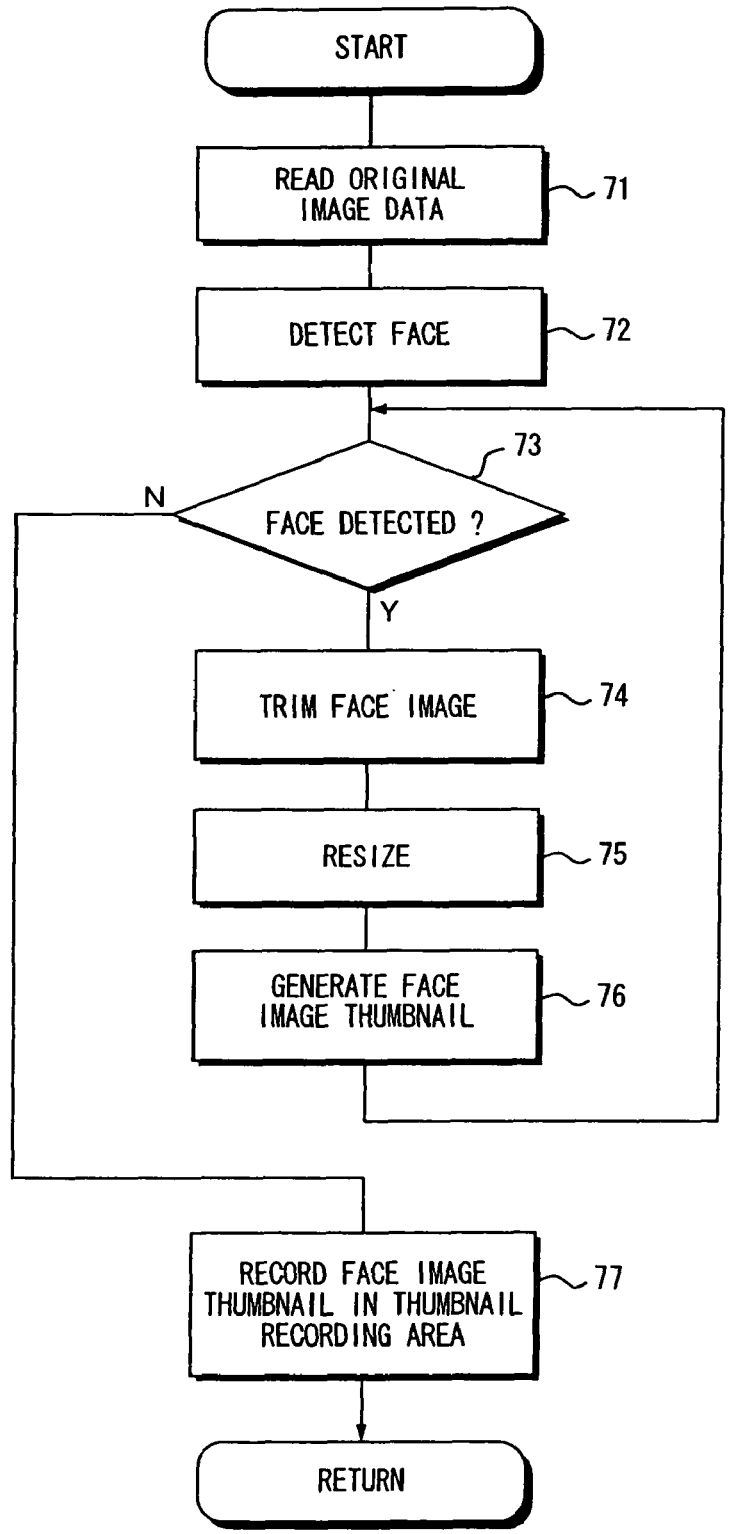
FIG. 9 is a flowchart illustrating other processing executed by the face image recording apparatus.

FIG. 9 is a flowchart illustrating other processing executed by the face image recording apparatus.

This processing records data, which represents the thumbnail image of a face image, in a thumbnail recording area of an original image file.

Original image data is read from the memory card 9 (step 71) and the image of a face is detected from the original image (step 72) in the manner described above. When the image of a face is detected ("YES" at step 73), trimming (step 74) and resizing (step 75) of the face image are carried out.

Thumbnail face image data representing the thumbnail image of the image of the face is generated from the image data representing the image of the face obtained (step 76). If the image of a face is no longer detected from the original image data ("NO" at step 73), the thumbnail face image data that has been generated is stored in the thumbnail recording area of the original image file and is recorded on the memory card 9 (step 77).

Figure 10:
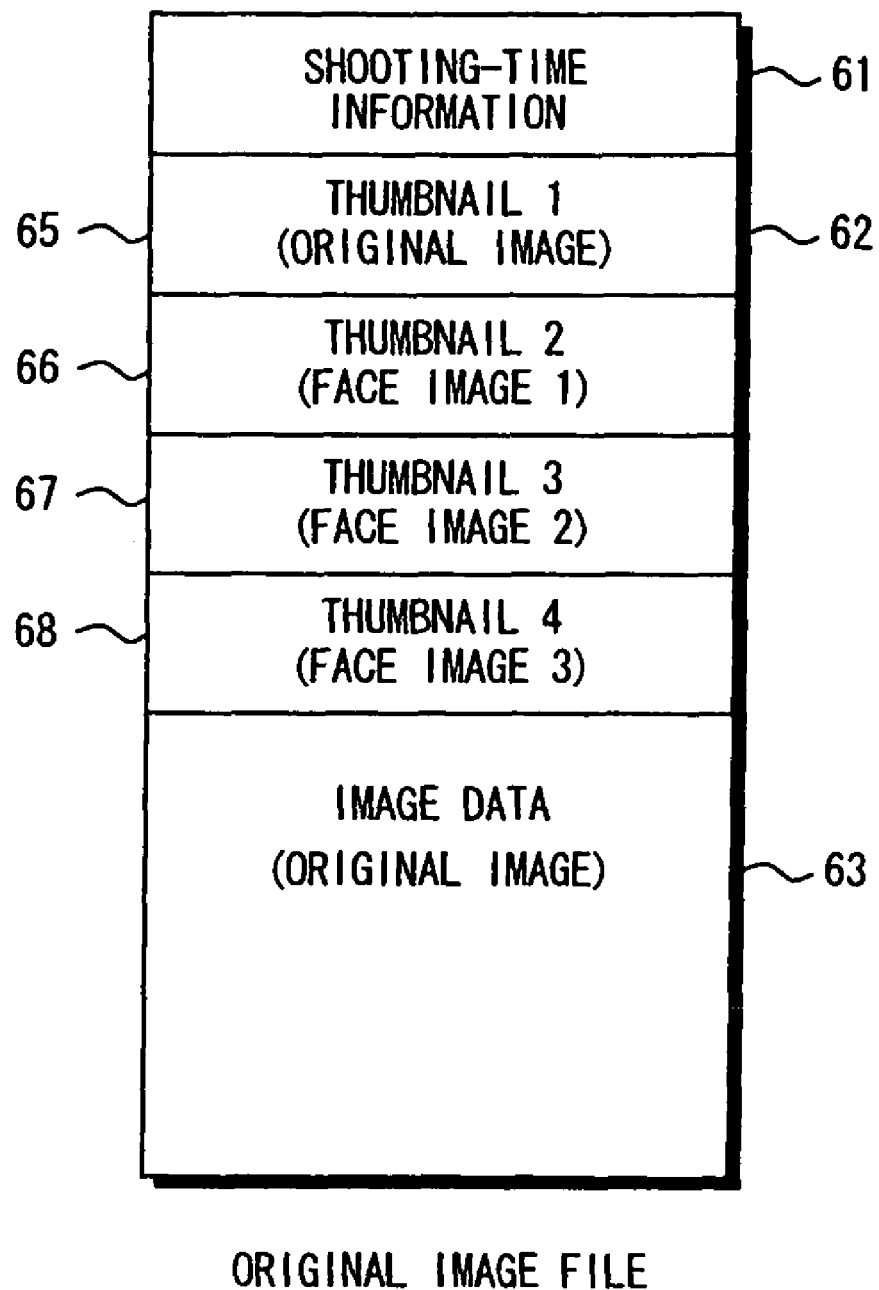
FIG. 10 illustrates an example of an original image file.

FIG. 10 is an example of another file structure of an original image file.

The above-mentioned shooting-time information recording area 61, thumbnail recording area 62 and image data recording area 63 have been defined in the original image file.

Original image data has been recorded in the image data recording area 63, and information that prevailed at shooting time when the original image data was obtained has been recorded in the shooting-time information recording area 61.

Four thumbnail recording areas 65, 66, 67 and 68 have been defined in the thumbnail recording area 62. Thumbnail original image data has been recorded in the first thumbnail recording area 65. Thumbnail face image data representing thumbnail images of face images that have been extracted from the original image represented by the original image data recorded in the image data recording area 63 has been recorded in respective ones of the second to fourth thumbnail recording areas 66 to 68.

In a case where the three face images 51, 52, 53 are contained in the original image 50, as illustrated in FIGS. 4 to 6A, 6B and 6C, the thumbnail face image data of these three face images 51 (55), 52 (56) and 53 (57) is recorded in the areas 66, 67 and 68, respectively.

Thus, it may be so arranged that both the thumbnail original image data and thumbnail face image data items are recorded in the thumbnail recording area 62. Of course, it may be so arranged that only the thumbnail face image data and not the thumbnail original image data is recorded in the thumbnail recording area 62. In this case, the first thumbnail recording area 65 in which is recorded the thumbnail original image data representing the thumbnail image of the original image represented by the original image data that has been recorded in the image data recording area 63 need not necessarily be within the thumbnail recording area 62.

Figure 11:
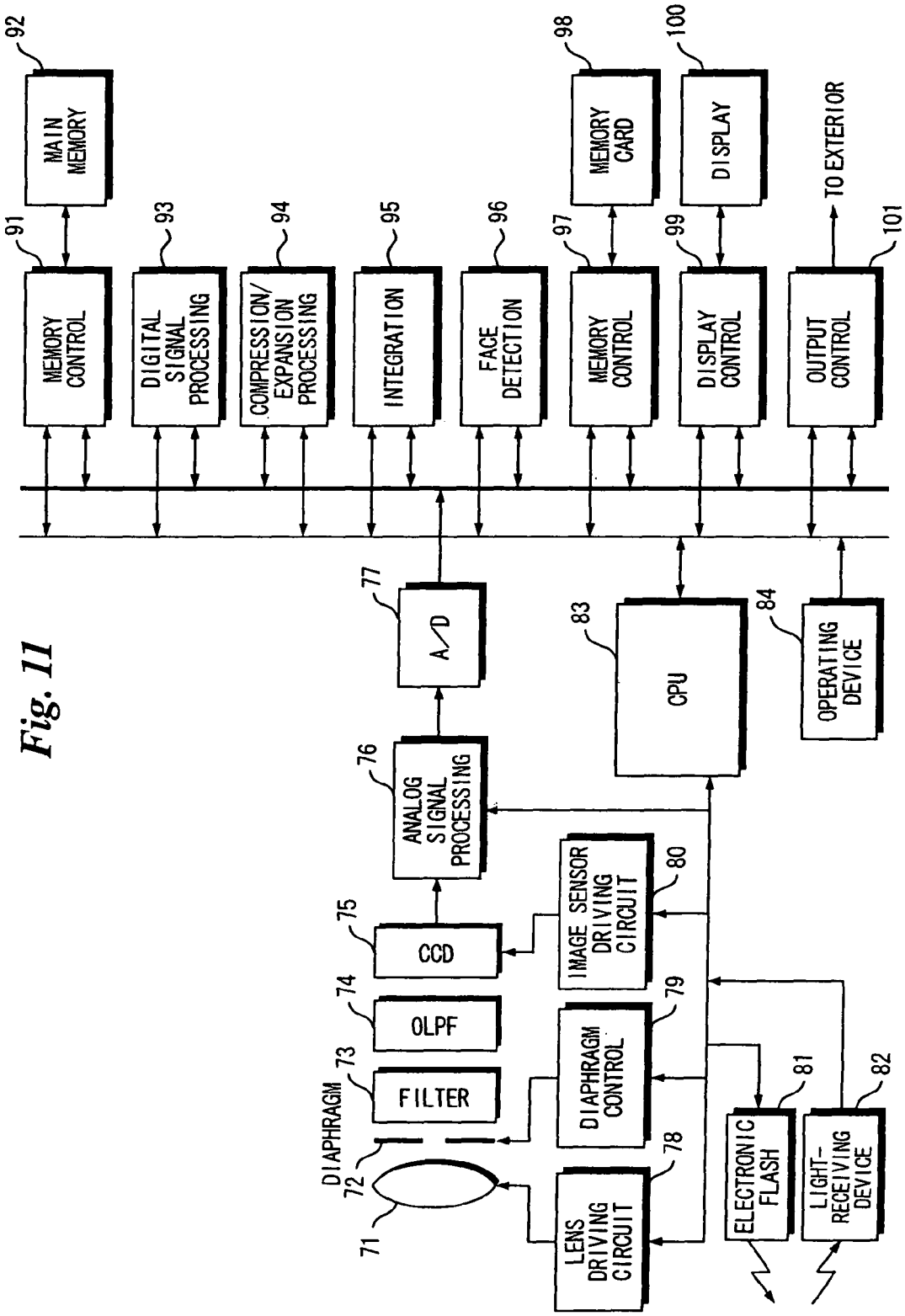
FIG. 11 is a block diagram illustrating the electrical structure of digital still camera.
Figure 12:
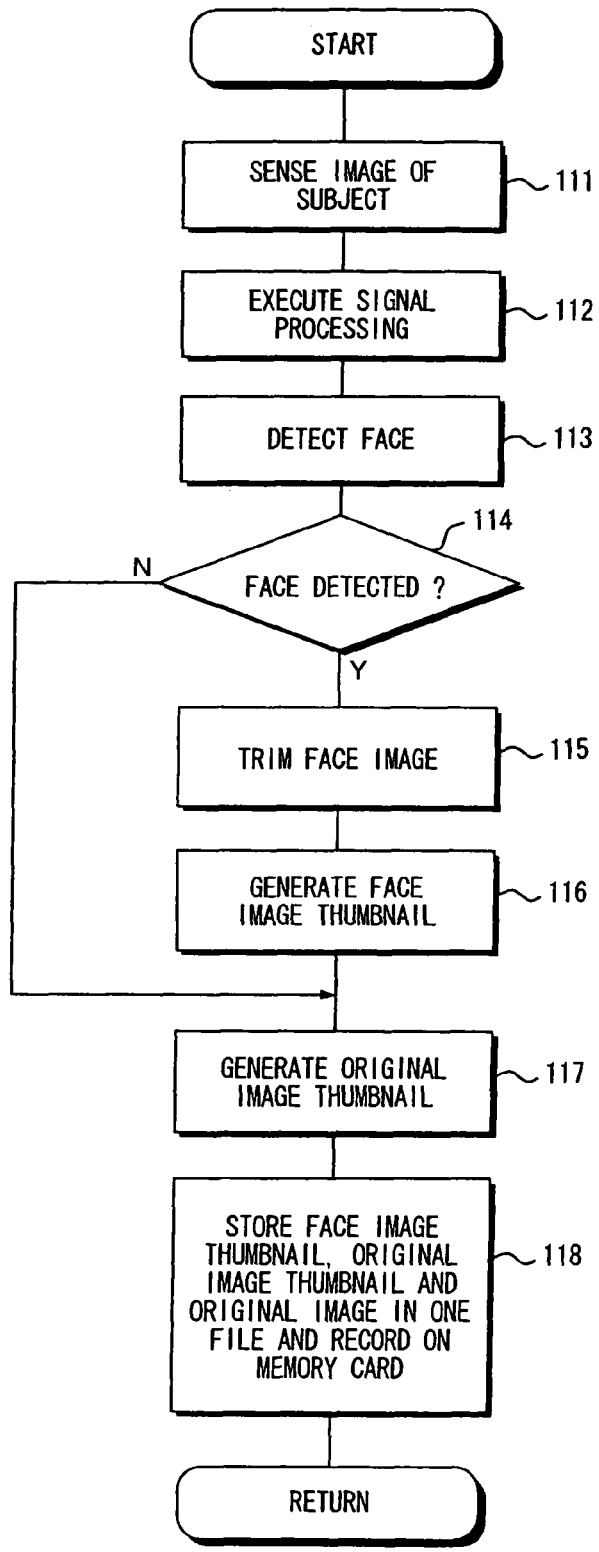
FIG. 12 is a flowchart illustrating processing executed by the digital still camera.

FIGS. 11 and 12 illustrate another embodiment of the present invention.

FIG. 11 is a block diagram illustrating the electrical structure of a digital still camera.

The operation of the overall digital still camera is controlled by a CPU 83.

An operating signal that is output from an operating device 84 that includes a shutter-release button of two-step stroke type and a mode switch is input to the digital still camera. The digital still camera is provided with an electronic-flash light-emission device 81 and a light-receiving device 82 that is for receiving reflected light from a subject in response to illumination of the subject by the electronic-flash light-emission device 81. The light-emission device 81 is controlled so as to render constant the received-light signal from the light-receiving device 82.

The lens position of an imaging lens 71 and the f-stop value of a diaphragm 72 are controlled by a lens driving circuit 78 and diaphragm control circuit 79. Light rays representing the image of the subject are condensed by the imaging lens 71 and impinge upon a CCD 75 via the diaphragm 72, an IR-cut filter 73 and an optical low-pass filter 73. The CCD 75 is controlled by an image sensor driving circuit 80 and outputs a video signal representing the image of the subject.

The video signal is subjected to prescribed analog signal processing such as a white balance correction and gamma correction in an analog signal processing circuit 76, and the processed signal is input to an analog/digital converting circuit 77. The latter converts the analog video signal to digital image data.

The digital image data is stored temporarily in a main memory 92 by a memory control circuit 91. The image data is read from the main memory 92 and is subjected to prescribed digital signal processing in a digital signal processing circuit 93. The image data that has undergone signal processing is applied to a display unit 100 by a display control circuit 99, whereby the image is displayed on the display screen of the display unit 100.

If the shutter-release button is pressed through the first step of its stroke, the image data that has been output from the analog/digital signal converting circuit 77 is integrated in an integrating circuit 95. On the basis of the integrated value obtained, the f-stop value of the diaphragm 72 and the shutter speed are decided so as to obtain an appropriate amount of exposure.

If the shutter-release button is pressed through the second step of its stroke, the image data that has been stored temporarily in the main memory 92 as mentioned above is read and applied to a compression/expansion processing circuit 94, where the image data is compressed. The compressed image data is stored on a memory card 98 by a memory control circuit 97 (this is an operation that records original image data).

The digital still camera is also provided with a face detecting circuit 96, whereby it is possible to extract face image data representing the image of a face from image data (original image data) that has been stored temporarily in the main memory 92. Further, in a manner similar to that described above, either of thumbnail original image data or thumbnail face image data can be generated depending upon how data is read out of the main memory 92. The generated thumbnail original image data and thumbnail face image data can be recorded on the memory card 98.

FIG. 12 is a flowchart illustrating processing executed by the digital still camera. This processing stores original image data obtained by sensing the image of a subject, thumbnail original image data representing a thumbnail image of the original image, and thumbnail face image data representing a thumbnail image of a face image in a single file.

Original image data representing the image of a subject is obtained by sensing the image of the subject (step 111). The original image data obtained is subjected to digital signal processing (step 112) and processing is executed to detect a face image from the original image (step 113). If a face image is detected ("YES" at step 114), then the face image detected is extracted by trimming (step 115). The face image obtained by trimming is subjected to size-reduction processing to thereby generate a thumbnail face image (step 116). The processing of steps 114 to 116 is executed repeatedly until the images of face are no longer detected in the original image.

When face images are no longer detected ("NO" at step 114), a thumbnail image of the original image is generated (step 117). The original image data, thumbnail original image data and thumbnail face image data obtained is stored in a single original image file, as illustrated in FIG. 10, and is recorded on the memory card 98 (step 118).

Figure 13:
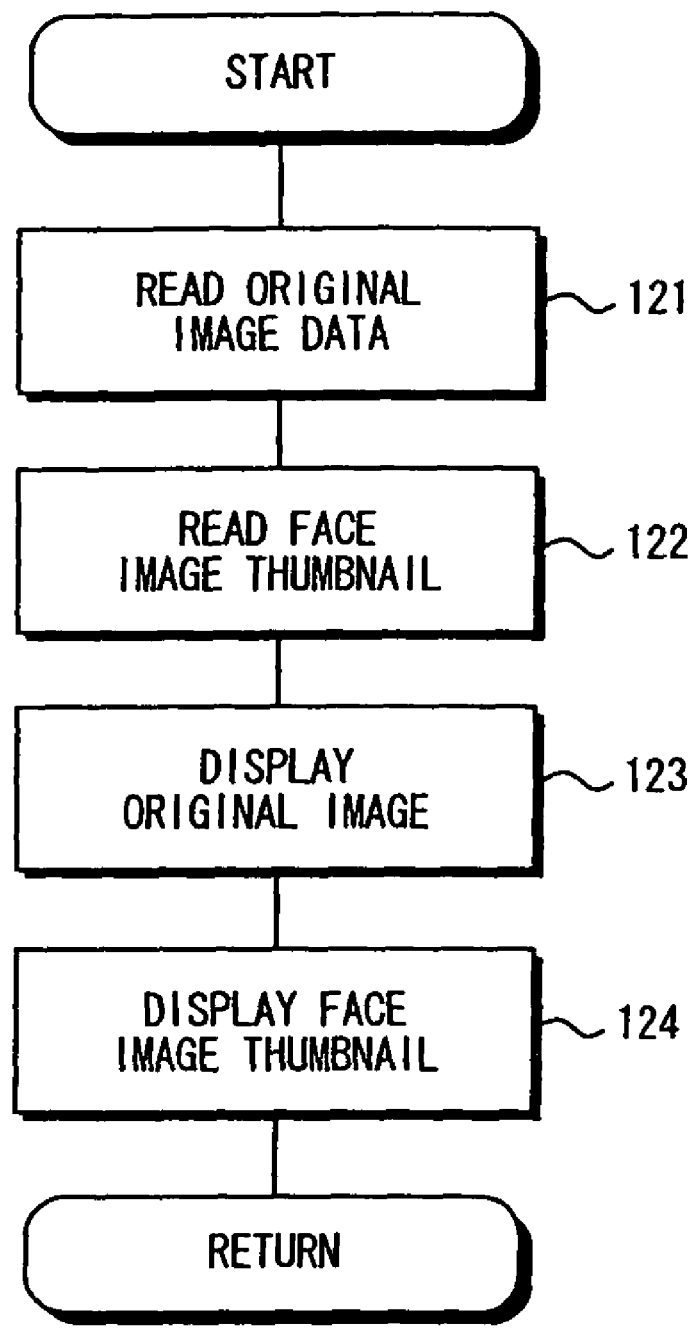
FIG. 13 is a flowchart illustrating playback processing.

FIG. 13 is a flowchart illustrating playback processing. This playback processing can be applied to the face image recording apparatus shown in FIG. 1 and to the digital still camera shown in FIG. 11 so that original images and thumbnail face images are displayed.

Original image data and thumbnail face image data has been recorded on a memory card. This original image data and thumbnail face image data is read from the memory card (steps 121, 122).

The original image represented by the read original image data and the thumbnail face image represented by the read thumbnail face image data are each displayed (steps 123, 124).

Figure 14:
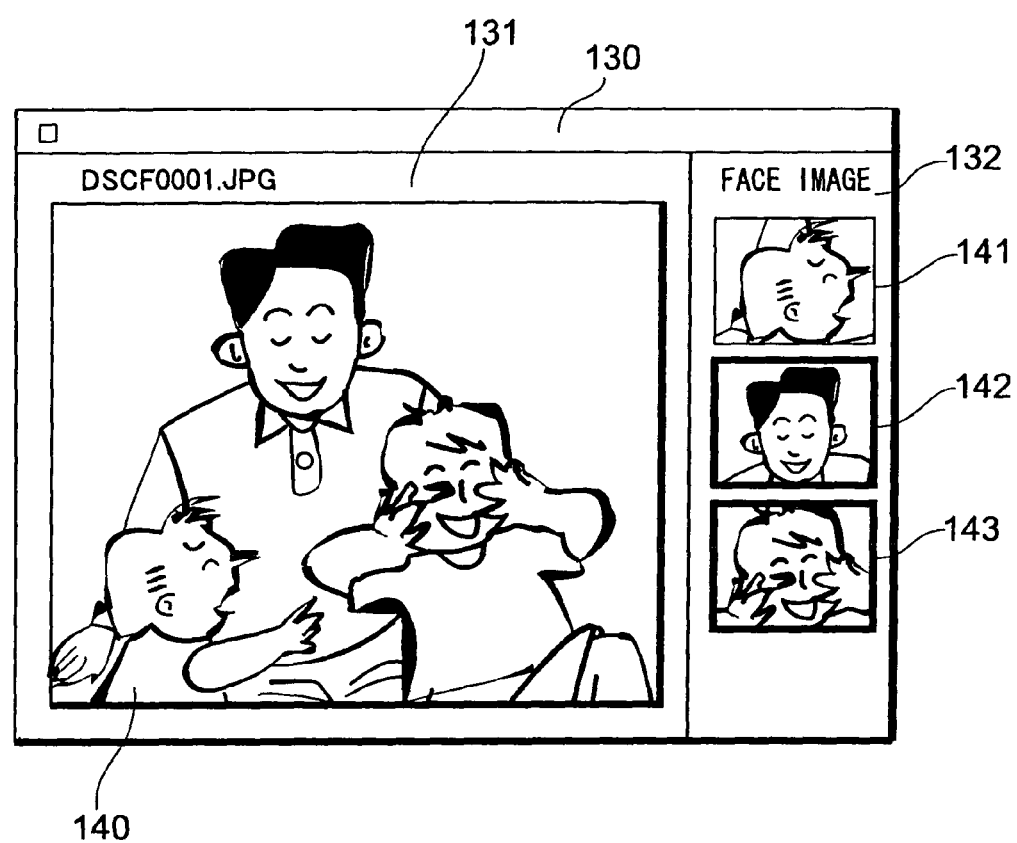
FIG. 14 illustrates an example of a window displayed on a display unit.

FIG. 14 illustrates an example of images displayed on the display unit.

An image display window 130 is displayed on the display screen of the display unit. An original image display area 131 and a face image display area 132 are formed on the left and right sides, respectively, of the image display window 130.

The original image display area 131 covers substantially the entire area of the image display window 130, and an original image 140 is displayed over the entirety of the area 131. The file name (DSCF0001.JPG) of the original image 140 also is displayed at the upper left of the original image 140. Thumbnail face images 141, 142 and 143 of face images that have been extracted from the original image 140 are displayed in the face image display area 132.

Since thumbnail images of face images in the original are thus displayed in the face image display area 132, the faces can be checked using the thumbnail face images even though the thumbnail images are small in size.

In a case where the original image is a so-called "group photograph", there are instances where there are many images of faces in the original image. Even if thumbnail images of these face images are displayed, it may be difficult to ascertain where in the original image the face images corresponding to the thumbnail images of these faces are located. In such instances it may be so arranged that in response to selection of the thumbnail of a face image by the user, the portion of the original image that is the corresponding face image is enclosed by a border. In this case it goes without saying that position information indicating where in the original image the face image is located would be stored in the face image file.

Figure 15:
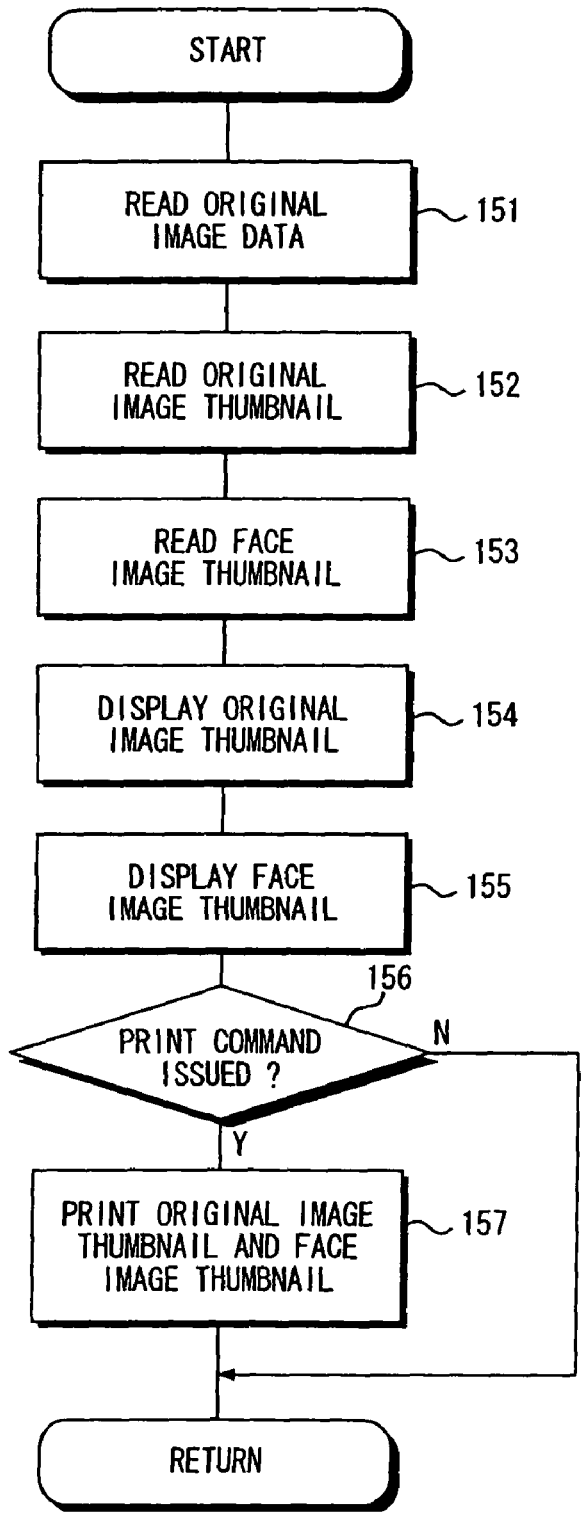
FIG. 15 is a flowchart illustrating other playback processing.
Figure 16:
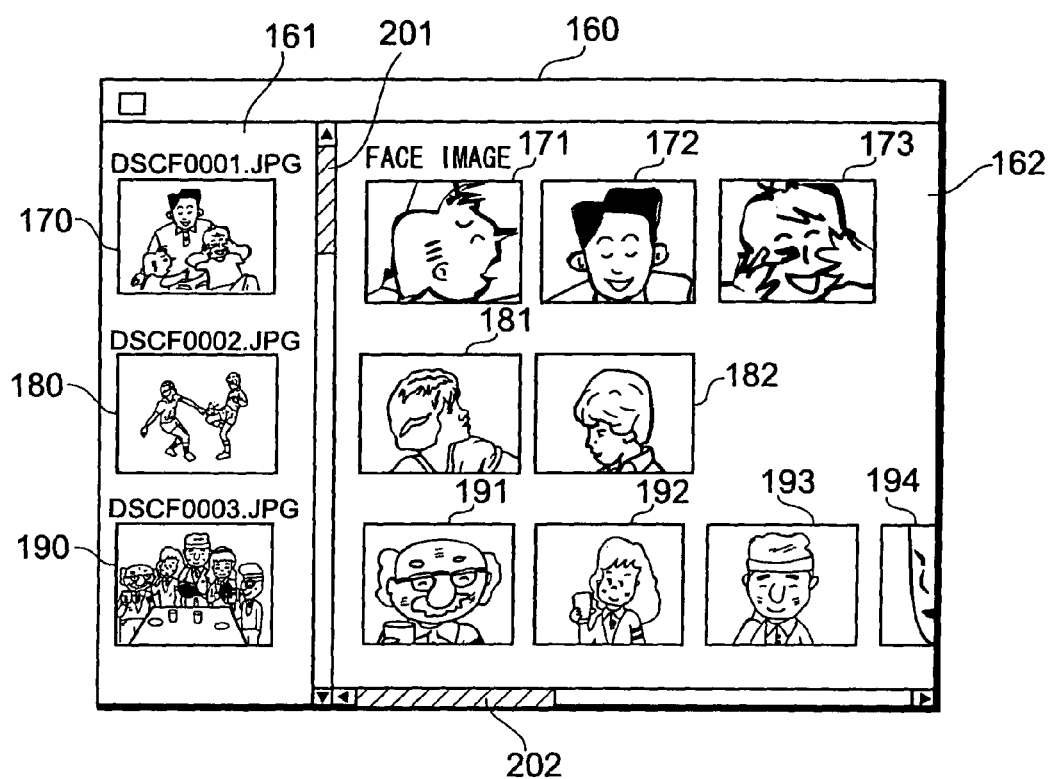
FIG. 16 illustrates an example of a window displayed on a display unit.

FIGS. 15 and 16 illustrate other playback processing.

FIG. 15 is a flowchart illustrating the procedure of playback processing.

This playback processing displays thumbnail original images and thumbnail face images.

Original image data, thumbnail original image data and thumbnail face image data has been recorded on a memory card. This original image data, thumbnail original image data and thumbnail face image data is read from the memory card (steps 151, 152, 153).

The thumbnail original image data that has been read is played back and a thumbnail of the original image is displayed (step 154). The thumbnail face image data that has been read is played back and a thumbnail of the face image is displayed (step 155). The thumbnail of the original image and the thumbnail of the face image are displayed on the same display screen. If the user applies a print command ("YES" at step 156), the thumbnail of the original image and the thumbnail of the face image being displayed on the same screen are printed (step 157).

FIG. 16 illustrates an example of images displayed on the display screen of the display unit.

An image display window 160 is displayed on the display screen of the display unit. An original image thumbnail display area 161 and a face image thumbnail display area 162 are formed on the left and right sides, respectively, of the image display window 160.

Thumbnail images 170, 180 and 190 of original images are displayed in a column in the original image thumbnail display area 161. Thumbnail images 171, 172, 173, 181, 182, 191, 192, 193 and 194, etc., of face images are displayed in rows corresponding to the thumbnail images of the original images in the face image thumbnail display area 162. For example, the thumbnails 171, 172 and 173 of the face images have been obtained by being extracted from the original image of the original image thumbnail 170. Thumbnails 181 and 182 of the other face images are displayed in the same row as that of thumbnail 180 of the original image, and thumbnails 191, 192, 193 and 194 of the other face images are displayed in the same row as that of thumbnail 190 of the original image.

A slide bar 201 that is moved up and down in response to an operation performed by the user is formed between the original image thumbnail display area 161 and the face image thumbnail display area 162. The original image thumbnail display area 161 and the face image thumbnail display area 162 are scrolled up and down in accordance with up-and-down movement of the slide bar 201. Further, a slide bar 202 that is moved to the left and right in response to an operation performed by the user is formed below the face image thumbnail display area 162. The face image thumbnail display area 162 is scrolled to the left and right in accordance with movement of the slide bar 202.

If these thumbnail images 170 to 173, 180 to 182 and 190 to 194 are clicked by the user, the corresponding originals are displayed on the display screen of the display unit. The area in which the original images are displayed may be inside the display window 160, on the display window 160 or may be an area separate from the area in which the image display window 160 is displayed. As mentioned above, the display window 160 that includes the thumbnail images 170 to 173, 180 to 182 and 190 to 194 is printed in response to application of a print command.

Although the sizes of face images extracted from an original image often differ from one another, it is preferred that the sizes of the thumbnails of the face images generated from the extracted face images be decided in such a manner that the sizes of the thumbnails will be uniform. Thus the thumbnail images of a large number of face images are displayed systematically. Further, the sizes of the thumbnails of face images and the sizes of the thumbnails of original images may be made identical. It goes without saying that in order to make the sizes of these thumbnails identical, enlargement or reduction processing is executed by the CPUs 1, 83 as necessary. Further, the thumbnail images may be processed in such a manner that the aspect ratio of thumbnails of face images and the aspect ratio of thumbnails of original images become the same. Thumbnail images will be displayed comparatively attractively as a result.

In a case where an original image file and a face image file corresponding to this original image file are recorded on the same memory card in the foregoing embodiments, it is preferred that the file name of the original image file and the file name of the face image file partially coincide. For example, if the file name of an original image file is DSCF0001.JPG, then the file name of the face image file is made FACE0001.JPG. Since parts of the file names coincide, it is comparatively easy to find an original image file from among face image files, and vice versa.

In an instance where the images of a large number of faces are detected, as when an original image is a group photograph, there is a large amount of data involving face images. This can use up the remaining storage capacity of the memory card and make it impossible to store data. In such case it may be so arranged that when face image data can no longer be recorded, the recording of the face image data is suspended and the user is alerted. Further, it may be so arranged that rather than recording all of the images of a large number of detected faces, images of a prescribed number of faces are recorded on the memory card in accordance with an order of priority (e.g., in order of decreasing or increasing size of the detected face images, in order of increasing distance from the center, or in an order of decreasing suitable brightness). Furthermore, it may be so arranged that the order of priority can be specified by the user.

In the embodiments described above, the image of a face is extracted from the image of an original. However, extracted images are not limited to face images. It may be so arranged that images of persons in their entirety, images of animals and other desired images of interest may be detected and recorded on a memory card in the manner described above. It goes without saying that in a case where image data representing an image of interest is recorded on a memory card, a sample image or the like for detecting the image of interest will have been recorded in the main memory 4, etc., in advance.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for recording an image of interest, said apparatus comprising:
    an image-of-interest detecting device for detecting a prescribed image of interest from an original image represented by applied original image data;
    an image-of-interest extracting device for extracting the image of interest detected by said image-of-interest detecting device;
    a recording control device for recording image-of-interest data, which represents the image of interest extracted by said image-of-interest extracting device, on a first recording medium in association with the original image data,
        wherein the original image data is recorded in an original image data recording area of an original image file in which a thumbnail image data recording area and the original image data recording area have been defined;
    and a thumbnail image-of-interest data generating device for generating thumbnail image-of-interest data representing a thumbnail image of the image of interest extracted by said image-of-interest extracting device,
        wherein said recording control device records the thumbnail image-of-interest data, which has been generated by said thumbnail image-of-interest data generating device, in the thumbnail image data recording area.

2. The apparatus according to claim 1, further comprising a first reading device for reading the original image data that has been recorded on a second recording medium,
    wherein the image-of-interest detecting device detects the image of interest by using the original image data read from the second recording medium.

3. The apparatus according to claim 2, wherein the first recording medium and the second recording medium are the same recording medium.

4. The apparatus according to claim 2, wherein the original image data is stored in an original image file and recorded on the second recording medium, and the image-of interest data is stored in an image-of-interest file different from the original image file and recorded on the first recording medium.

5. The apparatus according to claim 1, further comprising an image sensing device for sensing the original image and outputting the original image data representing the original image,
    wherein the image-of-interest detecting device detects the image-of-interest
by using the original image data output from the image sensing device.

6. The apparatus according to claim 1, wherein the image of interest comprises an image of a face.

7. The apparatus according to claim 1, further comprising a determination device for determining whether a plurality of images of interest have been extracted by said image-of-interest extracting device,
    wherein said recording control device records image-of-interest data representing the plurality of images of interest as individual frames on the first recording medium in accordance with extraction of the plurality of images of interest by said determination device.

8. The apparatus according to claim 1, further comprising an image-of-interest processing device for subjecting the image of interest extracted by said image-of-interest extracting device to at least one type of image processing from among resizing, brightness correction, color correction, sharpness correction, and noise reduction,
    wherein said recording control device records image-of-interest data, which represents the image-of-interest that has been subjected to the image processing by said image-of-interest processing device, on the first recording medium.

9. The apparatus according to claim 1, wherein the thumbnail image data recording area has been divided into a thumbnail original image data recording area and a thumbnail image-of-interest data recording area, the thumbnail original image data is recorded in the thumbnail original image data recording area, and the thumbnail image-of-interest data is recorded in the thumbnail image-of-interest data recording area.

10. The apparatus according to claim 9, further comprising:
- a second reading device for reading the thumbnail original image data that has been recorded in the thumbnail original image data recording area and the thumbnail image-of-interest data that has been recorded in the thumbnail image-of-interest data recording area; and
- a first display control device for controlling a display unit in such a manner that the thumbnail original image represented by the thumbnail original image data and thumbnail image-of-interest represented by the thumbnail image-of-interest data read by said second reading device are displayed on the same display screen.

11. The apparatus according to claim 1, further comprising:
- a third reading device for reading the image-of-interest data that has been recorded on the first recording medium; and
- a second display control device for controlling a display unit in such a manner that the original image represented by the applied original image data and the image-of-interest represented by the image-of-interest data read by said third reading device are displayed on the same display screen.

12. The apparatus according to claim 11, further comprising:
- an image-of-interest designating device for designating the image-of-interest displayed on the display unit; and
- a third display control device for controlling the display unit in such a manner that a part of the original image, which is displayed on the display unit, designated by said image-of-interest designating device will be clearly indicated.

13. The apparatus according to claim 11, wherein said second display control device controls the display unit so as to display the original image and the image-of-interest on the same display screen in such a manner that the size of the original image represented by the applied original image data and the size of the image-of-interest represented by the image-of-interest data read by said third reading device will take on the same size.

14. The apparatus according to claim 11, wherein said second display control device controls the display unit in such a manner that the original image represented by the applied original image data and the image-of-interest represented by the image-of-interest data read by said third reading device will be displayed in correspondence on the same display screen;
- said apparatus further comprising an output unit for outputting the original image and the image-of-interest, which are displayed on the same display screen, under the control of said second display control device.

15. The apparatus according to claim 1, wherein a file name of an original image file for establishing a linkage to the original image file and prescribed information regarding the image of interest extracted are recorded in a related-information recording area of the recording control device.

16. An apparatus for recording an image-of-interest, said apparatus comprising:
- an image-of-interest detecting device for detecting a prescribed image of interest from an original image represented by the applied original image data;
- an image-of-interest extracting device for extracting the image of interest detected by said image-of-interest detecting device;
- a thumbnail original image data generating device for generating thumbnail image data of the original image represented by the applied original image data;
- a thumbnail image-of-interest data generating device for generating thumbnail image-of-interest data representing a thumbnail image of the image of interest extracted by said image-of-interest extracting device; and
- a recording control device for storing the thumbnail original image data generated by said thumbnail original image data generating device, the thumbnail image-of-interest data generated by said thumbnail image-of-interest image data generating device and the applied original image data in a single original image file and recording the file on a recording medium.

17. A method of controlling an apparatus for recording an image of interest, said method comprising:
- detecting a prescribed image of interest from an original image represented by applied original image data;
- extracting the image of interest detected;
- recording image-of-interest data, which represents the image of interest extracted, on a recording medium in association with the original image data,
  - wherein the original image data is recorded in an original image data recording area of an original image file in which a thumbnail image data recording area and the original image data recording area have been defined;
- generating thumbnail image-of-interest data representing a thumbnail image of the image of interest extracted in said extracting the image of interest; and
- recording the thumbnail image-of-interest data, generated in said generating thumbnail image-of-interest data, in the thumbnail image data recording area.

18. A method of controlling an apparatus for recording an image-of-interest, said method comprising:
- detecting an image of interest from an original image represented by applied original image data;
- extracting the image of interest detected;
- generating thumbnail image data of the original image represented by the applied original image data;
- generating thumbnail image-of-interest data representing a thumbnail image of the image of interest extracted; and
- storing the thumbnail original image data generated, the thumbnail image-of-interest data generated and the applied original image data in a single original image file and recording the file on a recording medium.

19. A non-transitory computer readable medium embodied with a program for controlling an apparatus for recording an image of interest so as to cause the apparatus to:
- detect a prescribed image of interest from an original image represented by applied original image data;
- extract the image of interest detected; and
- record image-of-interest data, which represents the image of interest extracted, on a recording medium in association with the original image data,
- wherein the original image data is recorded in an original image data recording area of an original image file in which a thumbnail image data recording area and the original image data recording area have been defined,
- wherein the apparatus comprises a thumbnail image-of-interest data generating device for generating thumbnail image-of-interest data representing a thumbnail image of the image of interest extracted, and wherein the apparatus further comprises a recording control device that records the thumbnail image-of-interest data, which has been generated by said thumbnail image-of-interest data generating device, in the thumbnail image data recording area.

20. A non-transitory computer readable medium embodied with a program for controlling an apparatus for recording an image-of-interest so as to cause the apparatus to:

detect an image of interest from an original image represented by applied original image data;

extract the image of interest detected;

generate thumbnail image data of the original image represented by the applied original image data;

generate thumbnail image-of-interest data representing a thumbnail image of the image of interest extracted; and store the thumbnail original image data generated, the thumbnail image-of-interest data generated and the applied original image data in a single original image file and recording the file on a recording medium.

* * * * *